Oct. 9, 1923.

C. L. CALLIES 1,470,056

RAIL JOINT LOCKING DEVICE

Filed Oct. 3, 1922

INVENTOR
CARL. L. CALLIES.

BY Featherstonhaugh & Co.

ATTYS.

Oct. 9, 1923.
C. L. CALLIES
1,470,056
RAIL JOINT LOCKING DEVICE
Filed Oct. 3, 1922
2 Sheets-Sheet 2
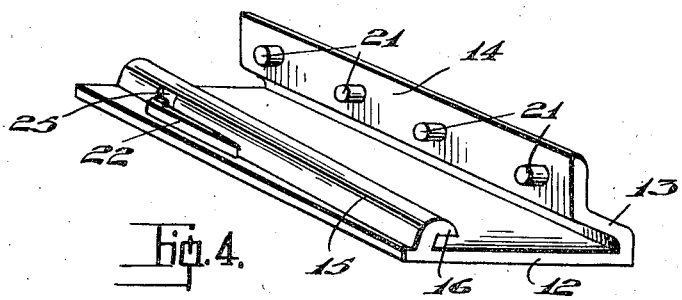
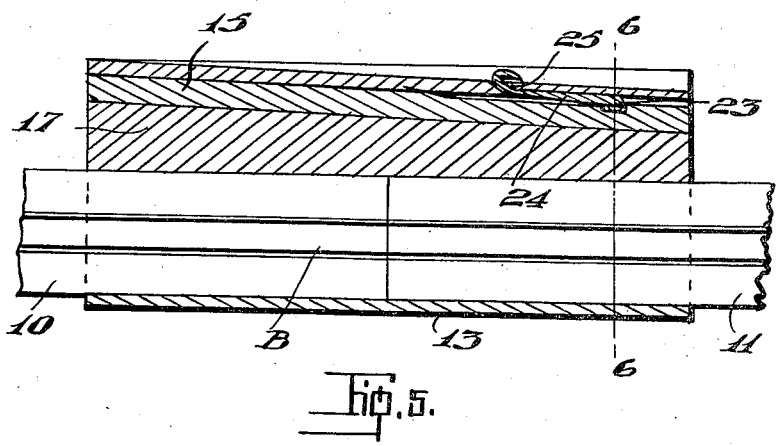
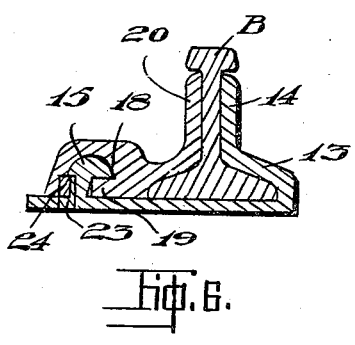
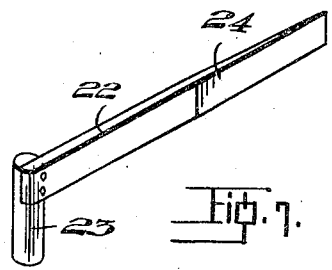
INVENTOR
CARL. L. CALLIES.
BY
ATTYS.

Patented Oct. 9, 1923.

1,470,056

UNITED STATES PATENT OFFICE.

CARL LOUIS CALLIES, OF WETASKIWIN, ALBERTA, CANADA.

RAIL-JOINT-LOCKING DEVICE.

Application filed October 3, 1922. Serial No. 592,182.

*To all whom it may concern:*

Be it known that I, CARL LOUIS CALLIES, of Wetaskiwin, in the Province of Alberta, Canada, a subject of the King of Great Britain, have invented certain new and useful Improvements in Rail-Joint-Locking Devices, of which the following is a specification.

This invention relates to a rail joint locking device, and has for its objects to provide an improved rail joint locking contrivance whereby the abutting ends of the rails are securely retained and forced into bearing engagement between two upright flanges carried by the plate.

Further objects are to provide a means whereby a sliding element is mounted on the plate and designed to continually force the rail against the flange mounted on the plate as it slides along the plate, to provide a locking means designed to lock the sliding element in bearing engagement with the rail, to provide a means whereby the abutting ends of the rails will be retained against any longitudinal movement relatively to the flange mounted on the joint plate.

Still further objects are to provide an improved rail joint locking device that is simple in construction, not liable to get out of repair, and generally to adapt the several parts to better perform the functions required of them.

With the above and other objects in view, the invention consists essentially of the improved construction, hereinafter described in detail in the accompanying specification and drawings.

In the drawings,

Figure 4 is a perspective view of the rail joint plate.

Figure 5 is a longitudinal section on the line 5—5 of Figure 3.

Figure 6 is a cross section taken on the line 6—6 of Figure 5.

Figure 7 is a perspective detail of the locking element.

Like characters of reference indicate corresponding parts in all the figures.

Figure 1:
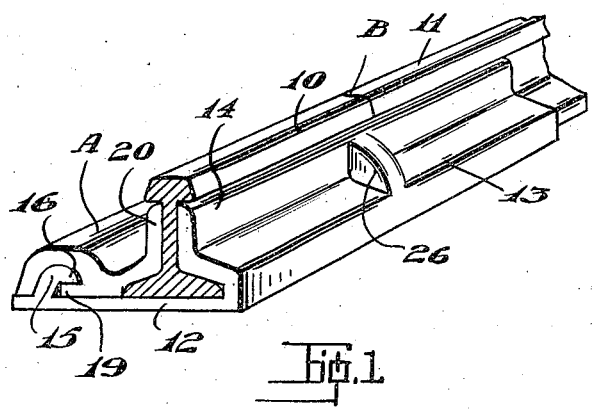
Figure 1 is a perspective view of the improved rail joint locking device.

Referring to the drawings, A represents the improved rail joint locking device, which is mounted on the rail joint B formed by the abutting rails 10 and 11. The rail joint locking device A consists of a plate 12 which is formed on one of its longitudinal edges with an offset extension 13 formed integral with an upright flange 14 designed to bear against one side of the rail web, while the rail base is engaged in the offset extension 13.

The plate 12 on the longitudinal edge remote from that provided with the extension 13 is formed with a rib 15 which is slanting relatively to the longitudinal edge of the plate 12 and is formed with a nose 16 spaced from the plate.

Slidably mounted on the rib 15 is a retaining member 17 which is formed with a longitudinal recess 18 designed to house the rib 15 and is provided with a longitudinal rib 19 adapted to engage the nose 16 of the rib 15. The retaining member 17 is provided with an upright flange 20 extending parallel to the rail web and designed to be gradually forced into bearing engagement therewith owing to the sliding movement of the retaining member 17 along the slanting rib 15, which movement gradually draws the upright flange 20 closer to the rail web until the two are in bearing engagement.

Figure 2:
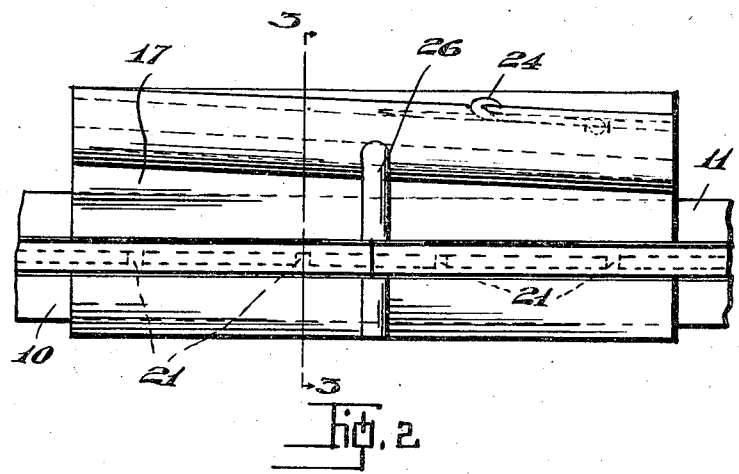
Figure 2 is a plan view.
Figure 3:
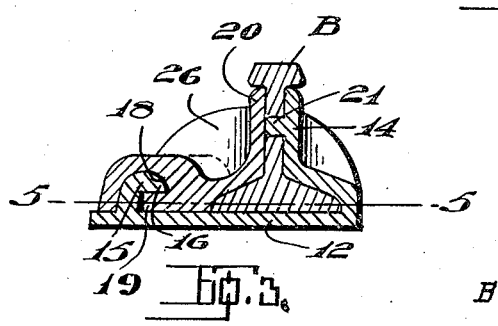
Figure 3 is a cross section on the line 3—3 of Figure 2.

Obviously when the retaining member 17 is driven along the rib 15, the web of the rails will be forced against the upright flange 14 and when the retaining member 17 has assumed its normal position as shown in Figure 2 of the drawings, the rail web will be securely caught between the two flanges 14 and 20 of the plate and the retaining member respectively.

In order to prevent any longitudinal movement of the abutting ends of the rails 10 and 11, the flange 14 is provided with a series of pegs 21 designed to engage a series of corresponding holes provided in the rail web.

In order to lock the retaining member 17 in bearing engagement with the rail web, a locking element 22 is provided which consists of a peg 23 secured to the larger end of a wedge 24. The peg 23 is engaged by a recess 24 provided in the plate 12 and rib 15, and an oblique orifice 25 is provided on the side wall of the recess 24 as shown in Figure 5 of the drawings.

When the retaining member 17 is being driven over the rib 15, the tapered end of the wedge 24 will be deflected into the oblique opening 25 and after the retaining member 17 has assumed its normal position will be hammered into the bent shape shown in Figures 2 and 5 of the drawings.

When a rail joint is to be secured by means of this improved locking device, a series of holes are bored into the webs of the abutting rails, and the plate 12 is brought into position underneath the rail. The pegs 21 are then forced into the bored holes into the rail webs. The retaining member 17 is then brought into engagement with the rib 15 and driven into normal position in bearing engagement with the rail web, when the locking element will be deflected through the oblique orifice 25 provided in the member 17.

After the retaining member 17 has assumed its normal position, the deflected tapered end of the wedge 24 is hammered down and locked into the position shown in Figure 2.

This obviously secures the retaining member 17 against any longitudinal movement relatively to the plate 12, while the abutting ends 10 and 11 of the rails are secured against longitudinal movement relatively to the plate 12 by means of the pegs 21 engaging the holes in the rail webs.

If desired, reinforcing transverse flanges 26 may be provided in order to support and strengthen the flanges 14 and 20. The portion of the flange 26 carried by the retaining member 17 may be used as a gripping element by means of which the retaining element may be slid longitudinally of the rail.

In order to remove this rail joint locking device, the bent end of the locking element 22 has first to be straightened up so that when the retaining member 17 is hammered out along the rib 15, the wedge 24 will be in position to slide out of the oblique orifice 25 provided in the retaining member 17. After the retaining member 17 has been removed from the plate 12, the latter has only to be disengaged from the rail web by removing the pegs 21 from the bored holes of the webs in order to be completely disengaged from the rails.

As many changes could be made in the above construction and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A rail locking device comprising a plate, having an offset extension on one side, an upright flange integral with the offset extension designed to bear against one side of the rail, a plurality of pegs formed on the upright flange designed to enter suitable orifices in the rail webs, a rib on the edge remote to the extension having slanting relation to the longitudinal edge of the plate, and being formed with a nose 16 spaced from the plate, a retaining member slidably mounted on the rib formed with a longitudinal recess designed to house the rib and provided with a longitudinal rib to engage the aforesaid nose 16, said retaining member being further formed with an upright flange extending parallel to the rail web and designed to be gradually forced into bearing engagement therewith, by a sliding movement of the retaining member along the rib, a locking element comprising a peg 23, with a longitudinally extending portion designed to extend through a suitable oblique orifice in the side wall of the retaining member.

In witness whereof I have hereunto set my hand in the presence of two witnesses.

CARL LOUIS CALLIES.

Witnesses:
R. W. MANLEY,
AGNES HODGINS.